US012565902B2

(12) United States Patent
Arikawa et al.

(10) Patent No.: US 12,565,902 B2
(45) Date of Patent: Mar. 3, 2026

(54) FLUID CIRCUIT

(71) Applicant: EAGLE INDUSTRY CO., LTD., Tokyo (JP)

(72) Inventors: Tatsuhiro Arikawa, Tokyo (JP); Yoshiyuki Shimada, Tokyo (JP); Tomoki Seki, Tokyo (JP); Yuta Okamoto, Tokyo (JP); Koji Sato, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 18/284,248

(22) PCT Filed: Mar. 17, 2022

(86) PCT No.: PCT/JP2022/012344
§ 371 (c)(1),
(2) Date: Sep. 26, 2023

(87) PCT Pub. No.: WO2022/209967
PCT Pub. Date: Oct. 6, 2022

(65) Prior Publication Data

US 2024/0167488 A1 May 23, 2024

(30) Foreign Application Priority Data

Mar. 31, 2021 (JP) ................................ 2021-059972

(51) Int. Cl.
*F15B 1/02* (2006.01)

(52) U.S. Cl.
CPC .......... *F15B 1/024* (2013.01); *F15B 2201/51* (2013.01); *F15B 2211/20546* (2013.01);
(Continued)

(58) Field of Classification Search
CPC ........ F15B 21/14; E02F 9/2207; E02F 9/2217
See application file for complete search history.

(56) References Cited

U.S. PATENT DOCUMENTS 2,938,347 A 5/1960 Sturgis
3,540,348 A 11/1970 Pennther ......................... 91/306
(Continued)

FOREIGN PATENT DOCUMENTS

EP 0439621 8/1990 ............. F15B 11/01
EP 3604827 2/2020
(Continued)

OTHER PUBLICATIONS

Parker Hannifin catalog "Hydraulic Cartridge Systems", HY15-3502/US, excerpt of pp. CV1-CV2. (Year: 2010).*
(Continued)

*Primary Examiner* — Michael Quandt
(74) *Attorney, Agent, or Firm* — HAYES SOLOWAY P.C.

(57) ABSTRACT

A fluid circuit includes: a fluid supply device that delivers a working fluid; and an accumulator that accumulates the working fluid which is increased in pressure. A variable throttle valve and the accumulator are disposed in a branch flow passage branched from a main flow passage extending from the fluid supply device to an actuator. A first pressure detector is provided between the variable throttle valve and the accumulator, a second pressure detector is provided in the branch flow passage between the main flow passage and the variable throttle valve, and the variable throttle valve is controllable based on pressures detected by the first pressure detector and the second pressure detector. A check valve is provided in the branch flow passage.

2 Claims, 7 Drawing Sheets

(52) U.S. Cl.
CPC ............... *F15B 2211/30505* (2013.01); *F15B 2211/625* (2013.01); *F15B 2211/6652* (2013.01); *F15B 2211/6653* (2013.01); *F15B 2211/88* (2013.01)

(56) References Cited

U.S. PATENT DOCUMENTS

| | | | | |
|---|---|---|---|---|
| 3,811,795 | A | 5/1974 | Olsen | F03C 1/10 |
| 5,007,544 | A | 4/1991 | Saotome | |
| 5,706,657 | A | 1/1998 | Ambroski | |
| 6,526,747 | B2 | 3/2003 | Nakatani | |
| 9,051,944 | B2 * | 6/2015 | Wen | F15B 21/14 |
| 9,279,236 | B2 * | 3/2016 | Zhang | E02F 9/2217 |
| 9,926,947 | B2 | 3/2018 | Villar | F04B 9/133 |
| 10,247,206 | B2 | 4/2019 | Shimada | F15B 13/0401 |
| 10,288,094 | B2 | 5/2019 | Spielvogel | |
| 2009/0317267 | A1 | 12/2009 | Gill et al. | |
| 2020/0032485 | A1 | 1/2020 | Hijikata et al. | |
| 2024/0159252 | A1 | 5/2024 | Shimada | F15B 1/04 |
| 2024/0159255 | A1 | 5/2024 | Shimada | F15B 9/08 |

FOREIGN PATENT DOCUMENTS

| | | | |
|---|---|---|---|
| GB | 2275969 | 9/1994 | F15B 3/00 |
| JP | 58102804 | 6/1983 | |
| JP | 58191388 | 12/1983 | |
| JP | 374605 | 3/1991 | F15B 11/00 |
| JP | H04120324 | 4/1992 | |
| JP | H04366001 | 12/1992 | F15B 3/00 |
| JP | H0777205 | 3/1995 | E02F 3/36 |
| JP | 10175459 | 6/1998 | |
| JP | 2000329103 | 11/2000 | |
| JP | 2003013904 | 1/2003 | F04B 9/105 |
| JP | 2008185182 | 8/2008 | F15B 21/14 |
| JP | 2008190694 | 8/2008 | F15B 11/00 |
| JP | 2011185417 | 9/2011 | |
| JP | 2014013062 | 1/2014 | |
| JP | 20168695 | 1/2016 | |
| JP | 2017150632 | 8/2017 | |
| JP | 2018204772 | 12/2018 | |
| JP | 2019049321 | 3/2019 | |
| KR | 20140094325 | 7/2014 | |
| WO | WO-2016169943 A1 * | 10/2016 | E02F 9/2217 |

OTHER PUBLICATIONS

International Search Report and Written Opinion, and International Preliminary Report on Patentability issued in PCT/JP2022/034388, dated Nov. 22, 2022, 24 pages.

International Search Report and Written Opinion, and International Preliminary Report on Patentability issued in PCT/JP2022/012344, dated May 31, 2022, 20 pages.

International Search Report and Written Opinion, and International Preliminary Report on Patentability issued in PCT/JP2022/012345, dated May 17, 2022, 24 pages.

International Search Report and Written Opinion, and International Preliminary Report on Patentability issued in PCT/JP2022/012346, dated May 31, 2022, 24 pages.

Official Action issued in related U.S. Appl. No. 18/284,520, dated Jul. 18, 2024, 10 pages.

Official Action issued in related U.S. Appl. No. 18/284,249, dated Sep. 28, 2024, 10 pages.

Official Action issued in related U.S. Appl. No. 18/284,520, dated Dec. 3, 2024, 10 pages.

* cited by examiner

FLUID CIRCUIT

TECHNICAL FIELD

The present invention relates to a fluid circuit, especially a fluid circuit including a fluid supply device and an accumulator.

BACKGROUND ART

In various fields, there is known a fluid circuit that drives an actuator using a working fluid such as working oil delivered from a fluid supply device such as a pump. Such a fluid circuit includes an accumulator capable of accumulating the working fluid that is increased in pressure, and is controllable based on pressure on a fluid supply device side and on pressure on an accumulator side.

For example, a fluid circuit disclosed in Patent Citation 1 includes a flow passage extending from a pump to an accumulator. A switching valve is provided in the flow passage between the pump and the accumulator. In addition, in the flow passage, a first pressure detector is provided between the switching valve and the accumulator, and a second pressure detector is provided between the pump and the switching valve.

The switching valve can switch between a non-return state where a working fluid can pass from a pump side to an accumulator side and an open state where the working fluid can pass in both directions. In the case of accumulating the working fluid, which is increased in pressure, in the accumulator, the working fluid delivered by the pump is accumulated in the accumulator by switching the switching valve to a non-return state. In addition, in the case of using the working fluid accumulated in the accumulator, the working fluid is delivered from the accumulator to the pump side by switching the switching valve to an open state.

CITATION LIST

Patent Literature

Patent Citation 1: JP H10-175459 A (PAGES 5 and 6, FIG. 1)

SUMMARY OF INVENTION

Technical Problem

The fluid supply device and the accumulator may be cooperated from the viewpoint of energy saving. In the fluid circuit as disclosed in Patent Citation 1, the flow rate of the working fluid to be delivered from the accumulator can be adjusted by controlling an opening degree of the switching valve based on a pressure difference between a pressure detected by the first pressure detector and a pressure detected by the second pressure detector. However, in an open state of the switching valve, the working fluid can pass in both directions between the pump and the accumulator. Therefore, the working fluid in a branch flow passage may be pushed back in an opposite direction or may be pulled in a positive direction due to the flow or pressure of the working fluid in a main flow passage, and the flow of the working fluid flowing into the actuator is not stabilized, which is a problem. Particularly, when a pressure difference between a discharge pressure of the pump and a pressure of the working fluid accumulated in the accumulator is small, the flow of the working fluid flowing into the actuator is not stabilized, which is a problem.

The present invention is conceived in view of such problems, and an object of the present invention is to provide a fluid circuit capable of stabilizing the flow of a working fluid flowing into an actuator.

Solution to Problem

In order to solve the foregoing problems, according to the present invention, there is provided a fluid circuit including: a fluid supply device that delivers a working fluid; an accumulator that accumulates the working fluid which is increased in pressure; a variable throttle valve, the accumulator and the variable throttle valve being disposed in a branch flow passage branched from a main flow passage extending from the fluid supply device to an actuator; a first pressure detector provided between the variable throttle valve and the accumulator; and a second pressure detector provided in the branch flow passage between the main flow passage and the variable throttle valve, wherein the variable throttle valve is controllable based on pressures detected by the first pressure detector and the second pressure detector, and a check valve is provided in the branch flow passage. According to the aforesaid feature of the present invention, in an open state where the variable throttle valve is opened and the working fluid is delivered from the accumulator to the main flow passage, when the working fluid delivered from the fluid supply device is prevented from flowing into an accumulator side by the check valve, and a pressure difference obtained by subtracting a pressure on a fluid supply device side from a pressure on the accumulator side is a predetermined value or less, the movement of the working fluid from the accumulator to the fluid supply device side is restricted, so that the flow of the working fluid flowing into the actuator can be stabilized.

It may be preferable that the check valve is provided between the first pressure detector and the second pressure detector. According to this preferable configuration, when the pressure difference between the accumulator side and the fluid supply device side with respect to the check valve is small, a flow from the accumulator to the fluid supply device side is stopped by the check valve, so that a subtle fluctuation of the working fluid can be prevented from acting on the first pressure detector, and detection accuracy thereof can be improved.

It may be preferable that the check valve is provided between the variable throttle valve and the first pressure detector. According to this preferable configuration, a pressure fluctuation or pressure loss caused by operation of the variable throttle valve can be prevented from affecting the first pressure detector.

DESCRIPTION OF EMBODIMENTS

Modes for implementing a fluid circuit according to the present invention will be described below based on embodiments.

First Embodiment

A fluid circuit according to a first embodiment of the present invention will be described with reference to FIGS. 1 to 6.

Figure 1:
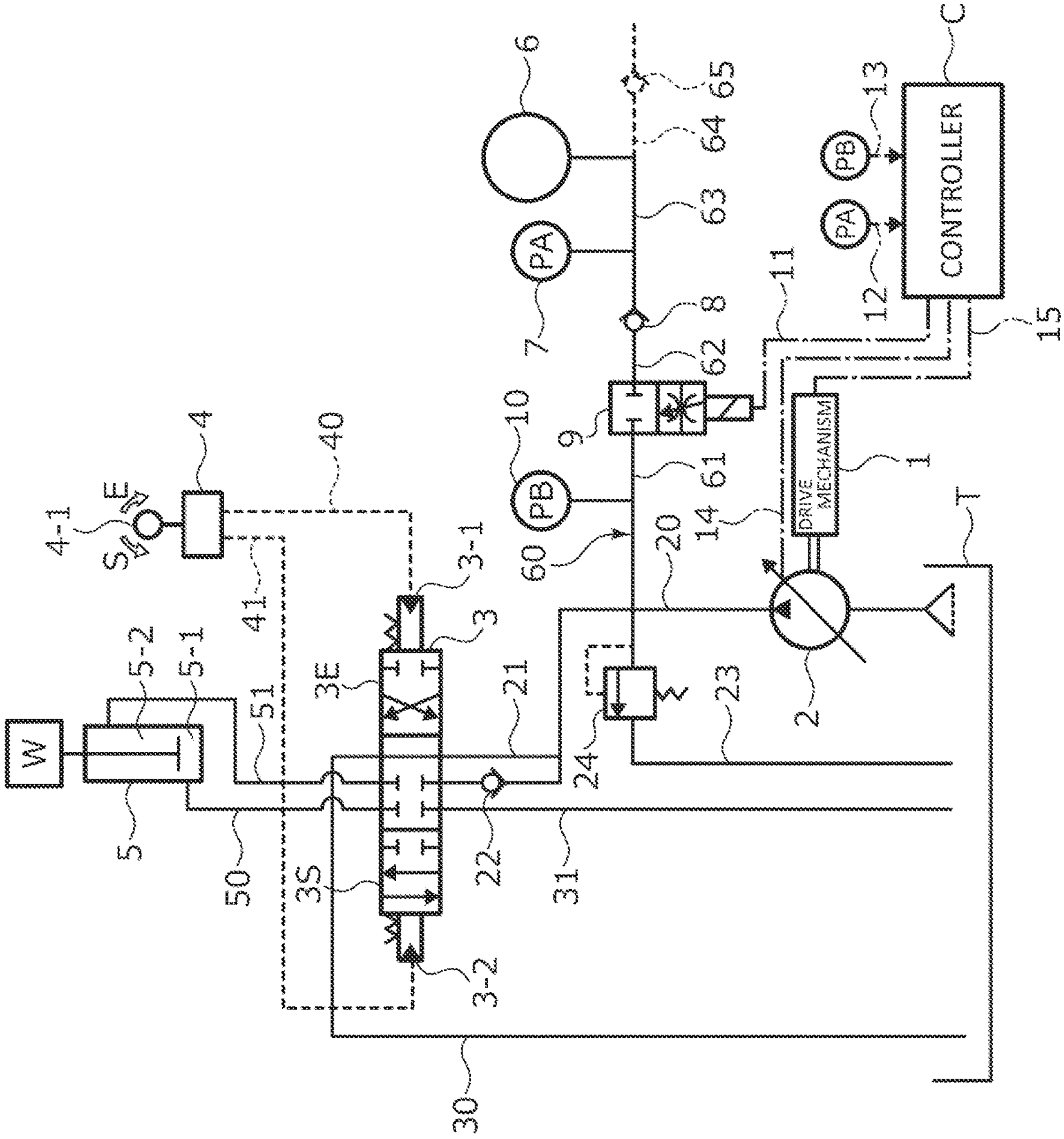
FIG. 1 is a schematic diagram illustrating a fluid circuit according to a first embodiment of the present invention.

As illustrated in FIG. 1, the fluid circuit can be applied to, for example, hydraulic devices such as an actuator, a brake, a steering wheel, and a transmission in normal passenger cars or work vehicles such as a truck, a hydraulic excavator, a forklift, a crane, and a garbage truck. Incidentally, the hydraulic circuit illustrated in FIG. 1 is one example of the fluid circuit of the present invention, and is not limited to a configuration of FIG. 1.

The fluid circuit of the present embodiment is generally configured to move a workpiece W by actuating a hydraulic cylinder 5 as an actuator using hydraulic pressure.

The fluid circuit mainly includes a variable capacity hydraulic pump 2 as a fluid supply device, a switching valve 3, a hydraulic remote control valve 4, the hydraulic cylinder 5, an accumulator 6, a first pressure detector 7, a check valve 8, a proportional electromagnetic throttle valve 9 as a variable throttle valve, a second pressure detector 10, a controller C, and each oil passage.

The hydraulic pump 2 is connected to a drive mechanism 1 such as an engine or an electric motor of a vehicle. Accordingly, the hydraulic pump 2 driven by power from the drive mechanism 1 delivers hydraulic oil to a main oil passage 20 as a main flow passage.

The hydraulic oil delivered from the hydraulic pump 2 flows into the switching valve 3 through the main oil passage 20 and through an oil passage 21 that is branched and connected to the main oil passage 20.

The switching valve 3 is a six-port and three-position type open center switching valve. The switching valve 3 at a neutral position connects the oil passage 21 to a tank-side oil passage 30 and to a tank T. For this reason, the entire amount of the hydraulic oil delivered from the hydraulic pump 2 is discharged to the tank T.

In addition, the switching valve 3 at an extension position 3E connects the main oil passage 20 to a head-side oil passage 50 of the hydraulic cylinder 5 (hereinafter, simply referred to as the head-side oil passage 50). At the same time, the switching valve 3 connects a rod-side oil passage 51 of the hydraulic cylinder 5 (hereinafter, simply referred to as the rod-side oil passage 51) to a tank-side oil passage 31 and to the tank T.

In addition, the switching valve 3 at a contraction position 3S connects the main oil passage 20 to the rod-side oil passage 51 of the hydraulic cylinder 5. At the same time, the switching valve 3 connects the head-side oil passage 50 to the tank-side oil passage 31 and to the tank T.

The hydraulic remote control valve 4 is a variable pressure reduction valve. The hydraulic remote control valve 4 reduces the hydraulic oil of a pilot primary pressure delivered from a pilot circuit hydraulic pump (not illustrated), to a pilot secondary pressure according to an operation amount of an operation lever 4-1. The hydraulic oil of the pilot primary pressure referred to here is hydraulic oil delivered from the pilot circuit hydraulic pump. The hydraulic oil of the pilot secondary pressure acts on signal ports 3-1 and 3-2 of the switching valve 3 through signal oil passages 40 and 41.

Operation of the hydraulic cylinder 5 according to operation of the hydraulic remote control valve 4 will be described. The switching valve 3 is switched to the extension position 3E by operating the operation lever 4-1 in an extension direction E. Then, the hydraulic oil delivered from the hydraulic pump 2 flows into a head chamber 5-1 of the hydraulic cylinder 5 through the head-side oil passage 50 connected to the main oil passage 20. At the same time, the hydraulic oil that has flowed out from a rod chamber 5-2 is discharged to the tank T through the tank-side oil passage 31 connected to the rod-side oil passage 51. Accordingly, the hydraulic cylinder 5 can be extended to lift the workpiece W.

In addition, the switching valve 3 is switched to the contraction position 3S by operating the operation lever 4-1 in a contraction direction S. Then, the hydraulic oil delivered from the hydraulic pump 2 flows into the rod chamber 5-2 of the hydraulic cylinder 5 through the rod-side oil passage 51 connected to the main oil passage 20. At the same time, the hydraulic oil that has flowed out from the head chamber 5-1 is discharged to the tank T through the tank-side oil passage 31 connected to the head-side oil passage 50. Accordingly, the hydraulic cylinder 5 can be contracted to lower the workpiece W.

In addition, a relief flow passage 23 connected to the tank T is branched and connected to the main oil passage 20 on an upstream side of a check valve 22. A relief valve 24 is disposed in the middle of the relief flow passage 23. When pressure in the main oil passage 20 becomes abnormally high, the relief valve 24 is released. Accordingly, the hydraulic oil is discharged from the relief flow passage 23 to the tank T.

In addition, a branch oil passage 60 as a branch flow passage is branched and connected to the main oil passage 20 on the upstream side of the check valve 22.

The branch oil passage 60 is formed of oil passages 61, 62, 63, and 64. Specifically, in the branch oil passage 60, the oil passage 61, the proportional electromagnetic throttle valve 9, the oil passage 62, the check valve 8, the oil passage 63, the accumulator 6, and the oil passage 64 are connected to each other in order from a main oil passage 20 side.

In addition, the oil passage 64 is connected to the head chamber 5-1 of the hydraulic cylinder 5 through a check valve 65 and through a switching valve (not illustrated). Accordingly, the accumulator 6 can accumulate the hydraulic oil delivered from the head chamber 5-1, according to a contraction operation of the hydraulic cylinder 5.

Incidentally, accumulation means for the accumulator 6 may be, for example, a hydraulic pump other than the hydraulic cylinder 5.

Figure 2:
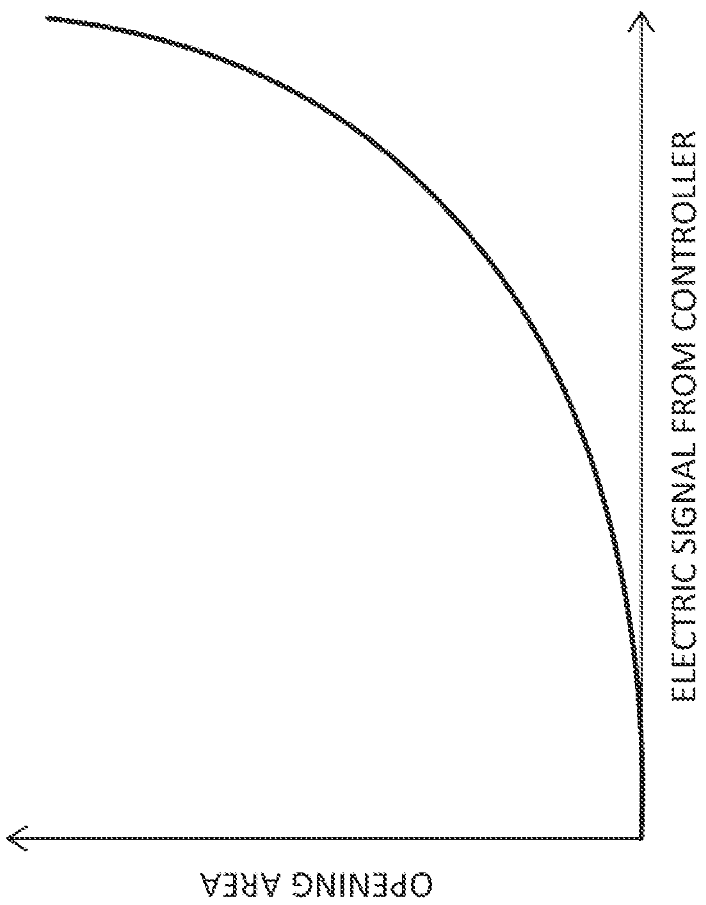
FIG. 2 is a graph for describing a characteristic of a variable throttle valve in the first embodiment.

The proportional electromagnetic throttle valve 9 is connected to the controller C through an electric signal line 11. As illustrated in FIG. 2, in a state where a signal is not input from the controller C, the proportional electromagnetic throttle valve 9 is in a closed state where the oil passages 61 and 62 do not communicate with each other. In addition, in a state where a signal is input from the controller C, the proportional electromagnetic throttle valve 9 is in an open state where the oil passages 61 and 62 communicate with each other. In addition, when the proportional electromagnetic throttle valve 9 is in an open state, the signal input from the controller C is large, for example, the higher the voltage is, the further the opening degree increases in a quadratic curve shape.

In addition, returning to FIG. 1, the second pressure detector 10 is disposed in the oil passage 61 that connects the main oil passage 20 and the proportional electromagnetic throttle valve 9. In addition, the first pressure detector 7 is disposed in the oil passage 63 that connects the check valve 8 and the accumulator 6.

The first pressure detector 7 is connected to the controller C through an electric signal line 12. The first pressure detector 7 transmits a detected pressure PA signal on an accumulator 6 side to the controller C. The second pressure detector 10 is connected to the controller C through an electric signal line 13. The second pressure detector 10 transmits a detected pressure PB signal on a main oil passage 20 side to the controller C.

The controller C is connected to a flow rate control unit of the hydraulic pump 2 through an electric signal line 14. The controller C can adjust the amount of delivery of the hydraulic pump 2. In addition, the controller C is connected to a control unit of the drive mechanism 1 for the hydraulic pump 2 through an electric signal line 15.

A drive source that actuates the hydraulic cylinder 5 is the hydraulic pump 2 alone, the accumulator 6 alone, or the hydraulic pump 2 and the accumulator 6 in cooperation with each other. In the following description, an example in which the hydraulic pump 2 and the accumulator 6 are cooperated to extend the hydraulic cylinder 5 will be described with reference to FIGS. 1 to 5.

Figure 3:
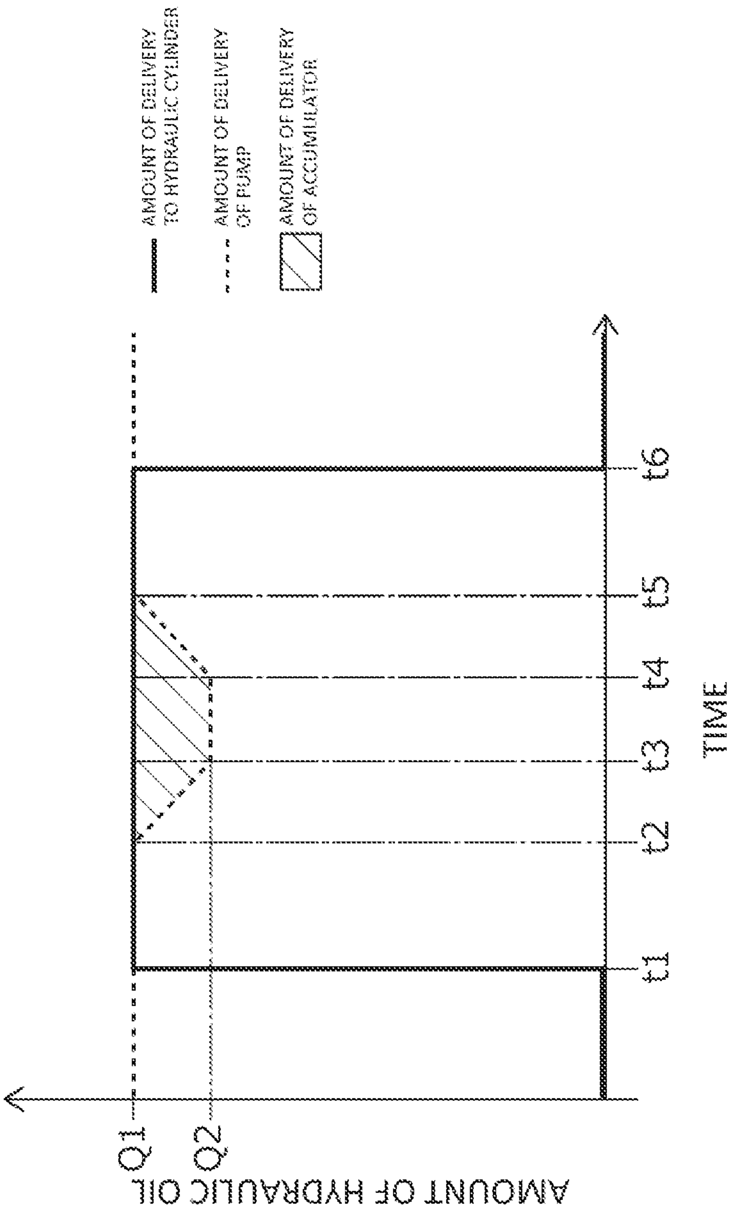
FIG. 3 is a graph for describing a relationship among the amount of delivery of a working fluid to a hydraulic cylinder, the amount of delivery of the working fluid by a pump, and the amount of delivery of the working fluid by an accumulator in the first embodiment.

Referring to FIG. 3, when the hydraulic remote control valve 4 is operated in the extension direction E by a maximum amount, the switching valve 3 is switched to the extension position 3E at a time t1. Accordingly, as indicated by a solid line in FIG. 3, the hydraulic oil is delivered from the hydraulic pump 2 to the hydraulic cylinder 5 at a substantially constant flow rate Q1. Incidentally, driving conditions of the hydraulic pump 2 do not change around time t1, and the hydraulic oil from the hydraulic pump 2 is delivered to the tank T through the oil passage 30 before time t1.

When the controller C determines that a pressure PA on the accumulator 6 side is larger than a value obtained by adding a predetermined pressure α to a pressure PB on the main oil passage 20 side (i.e., PA>PB+α) after the switching valve 3 is switched to the extension position 3E, the controller C determines that the accumulator 6 can be used.

When the accumulator 6 can be used, the controller C outputs a signal to reduce the flow rate of the hydraulic pump 2 to a target flow rate Q2, based on a pressure difference ΔPAB between the pressure PA and the pressure PB and on a load L of the hydraulic cylinder 5, and outputs a signal to open the proportional electromagnetic throttle valve 9.

Accordingly, as indicated by a dotted line between times t2 and t3 in FIG. 3, the amount of delivery of the hydraulic pump 2 gradually decreases with time according to a response characteristic of the hydraulic pump 2. Then, the amount of delivery of the hydraulic pump 2 is the substantially constant flow rate Q2 after time t3 that the amount of delivery has reached the target flow rate Q2.

Figure 4:
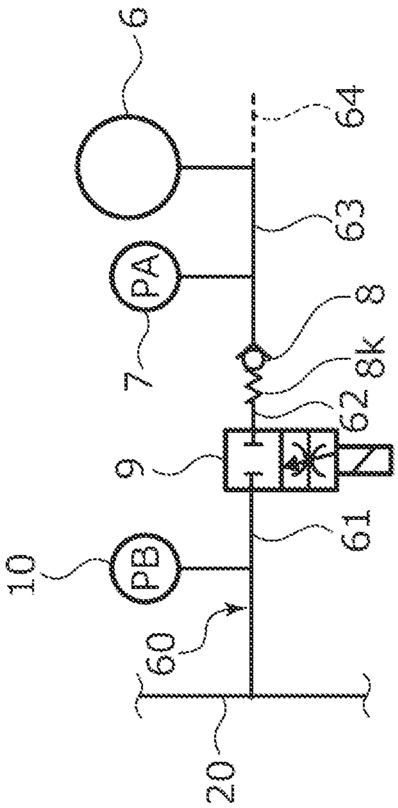
FIG. 4 is a schematic diagram of a branch flow passage when the variable throttle valve is in a closed state in the first embodiment.
Figure 5:
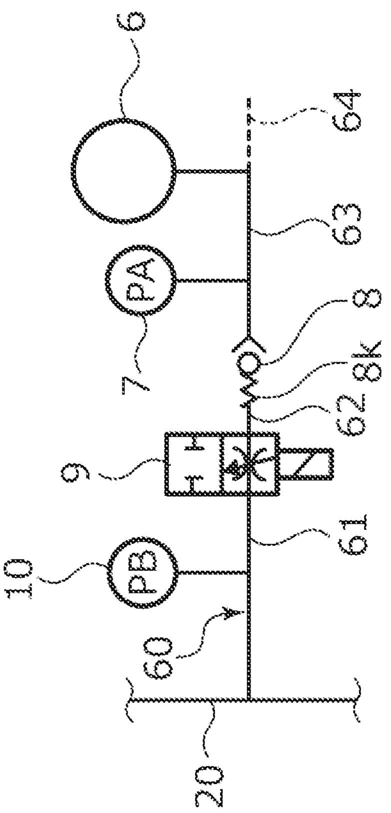
FIG. 5 is a schematic diagram of the branch flow passage when the variable throttle valve is in an open state in the first embodiment.

In addition, the controller C switches the proportional electromagnetic throttle valve 9 from a closed state illustrated in FIG. 4 to a throttled open state (hereinafter, simply referred to as an open state) illustrated in FIG. 5. The opening degree of the proportional electromagnetic throttle valve 9 at this time is adjusted according to a reduced flow rate of the hydraulic pump 2 and to the pressure difference ΔPAB.

For example, since the pressure difference ΔPAB is used to supply the hydraulic oil from the accumulator 6 at a flow rate corresponding to the reduced flow rate of the hydraulic pump 2, an opening area of the proportional electromagnetic throttle valve 9 may be determined such that even after time t2, the pressure PB on the main oil passage 20 side is kept at substantially the same constant pressure as between times t1 and t2.

Incidentally, a method for supplying the hydraulic oil from the accumulator 6 at the flow rate corresponding to the reduced flow rate of the hydraulic pump 2 is not limited to keeping the pressure PB on the main oil passage 20 side substantially constant, and an opening area of the proportional electromagnetic throttle valve 9 may be determined using the response characteristic of the hydraulic pump 2 stored in advance.

Here, since a response characteristic of the proportional electromagnetic throttle valve 9 is sufficiently better than the response characteristic of the hydraulic pump 2, the flow rate to be supplied to the main oil passage 20 is accurately controllable by controlling the opening area of the proportional electromagnetic throttle valve 9 according to an actuated state of the hydraulic pump 2 as described above.

Accordingly, the hydraulic oil is delivered from the accumulator 6 to the main oil passage 20 through the oil passage 63, the check valve 8, the oil passage 62, the proportional electromagnetic throttle valve 9, and the oil passage 61.

Thereafter, when a value obtained by adding the predetermined pressure α to the pressure difference ΔPAB is smaller than a threshold value β determined in advance at a time t4 (i.e., ΔPAB+α<β), the controller C outputs a signal to return the flow rate of the hydraulic pump 2 to the target flow rate Q1, and outputs a signal to reduce the opening area of the proportional electromagnetic throttle valve 9 so as to close the proportional electromagnetic throttle valve 9.

After time t4, the opening area of the proportional electromagnetic throttle valve 9 is reduced to supply a flow rate corresponding to the response characteristic of the hydraulic pump 2. Accordingly, even after time t4, the pressure PB on the main oil passage 20 side can be kept substantially constant as between times t1 and t4. Then, at a time t5, the proportional electromagnetic throttle valve 9 is in a closed state illustrated in FIG. 4.

In such a manner, the amount of the hydraulic oil delivered from the accumulator 6 to the main oil passage 20 side is adjusted as indicated by diagonal hatching in FIG. 3. Accordingly, as indicated by the solid line in FIG. 3, the amount and the pressure PB of the hydraulic oil delivered to the hydraulic cylinder 5 are substantially the same as the amount and the pressure PB of the hydraulic oil when the hydraulic oil is delivered only by the hydraulic pump 2.

In addition, in the present embodiment, the amount of delivery from the accumulator 6 to the main oil passage 20 side is arbitrarily controllable by adjusting the opening degree of the proportional electromagnetic throttle valve 9 based on pressures detected by the pressure detectors 7 and 10. For this reason, for example, compared to a configuration in which an opening and closing valve is provided instead of the proportional electromagnetic throttle valve 9, when the proportional electromagnetic throttle valve 9 is switched, a large amount of the hydraulic oil does not flow into the main oil passage 20. Accordingly, it is possible to prevent an abnormality such as shock caused by a rapid change in the operation speed of the hydraulic cylinder 5, so that the hydraulic cylinder 5 can be smoothly operated.

Figure 6:
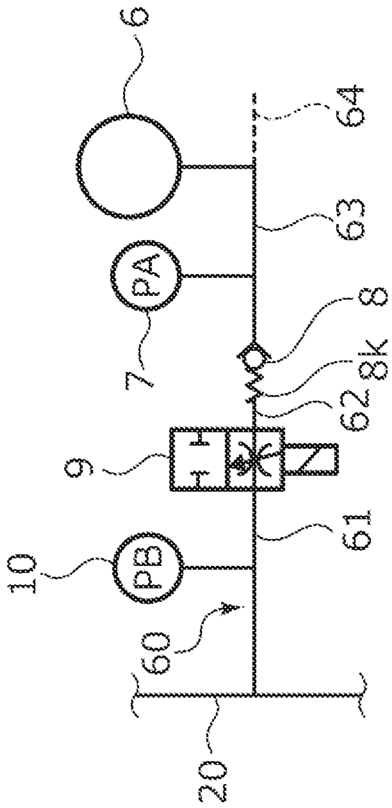
FIG. 6 is a schematic diagram describing a case where a pressure difference in the branch flow passage is small in an open state of the variable throttle valve in the first embodiment.

Here, when the accumulation amount of the accumulator 6 decreases and the pressure difference ΔPAB decreases in an open state of the proportional electromagnetic throttle valve 9, the hydraulic oil on the main oil passage 20 side may flow into the oil passage 61 due to a flow on the main oil passage 20 side, pulsation of the hydraulic oil delivered from the hydraulic pump 2, or the like; however, as illustrated in FIG. 6, the check valve 8 is closed, so that the hydraulic oil on the main oil passage 20 side is prevented from flowing into the accumulator 6 side. At this time, since a biasing force of a spring **8*k* that biases a valve body in a closing direction acts on the check valve 8, the check valve 8** is reliably closed.

In addition, since the biasing force of the spring **8*k* that biases the valve body in the closing direction acts on the check valve 8, when the pressure difference ΔPAB approaches zero in an open state of the proportional electromagnetic throttle valve 9, in other words, when the pressure difference ΔPAB becomes a predetermined value or less, as illustrated in FIG. 6, the check valve 8 is reliably closed, and the check valve 8 is unlikely to chatter. For this reason, control to cause the hydraulic pump 2 and the accumulator 6** to cooperate with each other is easily stabilized.

Accordingly, even when the pressure difference ΔPAB has decreased, the flow of the hydraulic oil flowing into the hydraulic cylinder 5 can be stabilized.

Incidentally, the above-described control when the controller C causes the hydraulic pump 2 and the accumulator 6 to cooperate with each other is an example, and may be changed as appropriate.

As described above, in the fluid circuit of the present embodiment, the check valve 8 is disposed between the pressure detectors 7 and 10, and when a pressure difference between a pressure on the accumulator 6 side in the oil passage 63 and a pressure on a hydraulic pump 2 side in the oil passage 62 with respect to the check valve 8 is small, a flow from the oil passage 63 to the oil passage 62 is stopped by the check valve 8, so that a subtle fluctuation of the hydraulic oil can be prevented from acting on the first pressure detector 7, and detection accuracy thereof can be improved.

In addition, the check valve 8 is disposed between the proportional electromagnetic throttle valve 9 and the first pressure detector 7. For this reason, when the proportional electromagnetic throttle valve 9 is switched from a closed state to an open state or from an open state to a closed state, even in a case where a pressure fluctuation or pressure loss occurs due to the switching operation, a pressure difference between the accumulator 6 side and a proportional electromagnetic throttle valve 9 side of the check valve 8 does not reach a pressure difference enough to open the check valve 8, so that the pressure fluctuation or pressure loss can be prevented from affecting the first pressure detector 7.

Second Embodiment

A fluid circuit according to a second embodiment of the present invention will be described with reference to FIG. 7. Incidentally, descriptions of the same duplicate configurations as the configurations of the first embodiment will be omitted.

Figure 7:
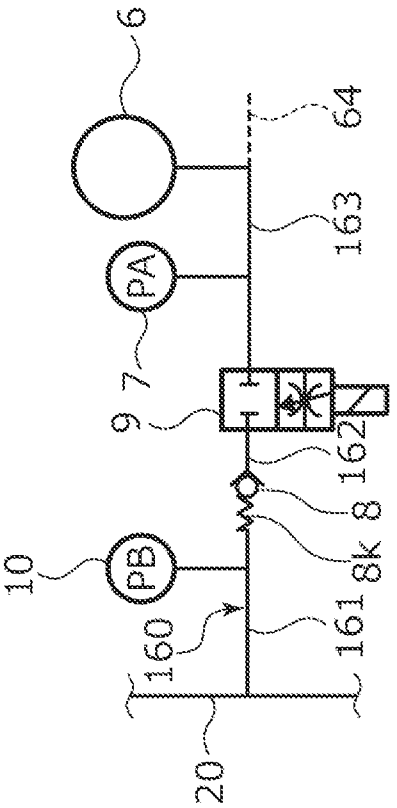
FIG. 7 is a schematic diagram illustrating main parts of a fluid circuit according to a second embodiment of the present invention.

As illustrated in FIG. 7, in the second embodiment, a branch oil passage 160 as a branch flow passage of the fluid circuit is formed of oil passages 161, 162, 163, and 64. Specifically, in the branch oil passage 160, the oil passage 161, the check valve 8, the oil passage 162, the proportional electromagnetic throttle valve 9, the oil passage 163, the accumulator 6, and the oil passage 64 are connected to each other in order from a main oil passage 20 side. The second pressure detector 10 is disposed in the oil passage 161, and the first pressure detector 7 is disposed in the oil passage 163.

In such a manner, since the check valve 8 is disposed between the second pressure detector 10 and the proportional electromagnetic throttle valve 9, even when a pressure difference between a pressure on the accumulator 6 side in the oil passage 162 and a pressure on the hydraulic pump 2 side in the oil passage 161 with respect to the check valve 8 is small, a flow from the oil passage 162 to the oil passage 161 is stopped by the check valve 8, so that a subtle fluctuation of the hydraulic oil can be prevented from acting on the first pressure detector 7, and detection accuracy thereof can be improved.

The embodiments of the present invention have been described above with reference to the drawings; however, the specific configurations are not limited to the embodiments, and the present invention also includes changes or additions that are made without departing from the scope of the present invention.

For example, in the first and second embodiments, the configuration has been described in which the working fluid is oil; however, the present invention is not limited to the configuration, and the working fluid may be a fluid or may be changed as appropriate.

In addition, in the first and second embodiments, the configuration has been described in which the hydraulic pump is driven before and after a series of work to perform an extension operation of the hydraulic cylinder, and the amount of the hydraulic oil per unit time delivered from the hydraulic pump is substantially constant; however, the present invention is not limited to the configuration, and the drive amount of the hydraulic pump may be increased after a command for an extension operation is received, for example, the hydraulic pump may be operable from a stopped state, or may be changed in state from a low-load operation state to a high-load operation state.

In addition, in the first and second embodiments, the configuration has been described in which the check valve is disposed between the first pressure detector and the second pressure detector; however, the present invention is not limited to the configuration, and the check valve may be disposed between the main oil passage and the second pressure detector.

In addition, in the first and second embodiments, the configuration has been described in which one check valve is disposed between the proportional electromagnetic throttle valve and the first pressure detector or between the proportional electromagnetic throttle valve and the second pressure detector; however, the present invention is not limited to the configuration, and a plurality of the check valves may be disposed in the branch oil passage. For example, the check valves may be disposed between the proportional electromagnetic throttle valve and the first pressure detector and between the proportional electromagnetic throttle valve and the second pressure detector, or may be disposed between the first pressure detector and the second pressure detector and at other locations in the branch oil passage.

REFERENCE SIGNS LIST

2 Hydraulic pump
5 Hydraulic cylinder (actuator)
6 Accumulator
7 First pressure detector
8 Check valve
9 Proportional electromagnetic throttle valve (variable throttle valve)
10 Second pressure detector
20 Main oil passage (main flow passage)
60 Branch oil passage (branch flow passage)
160 Branch oil passage (branch flow passage)
L Load
Q1, Q2 Target flow rate
PA Pressure on accumulator side
PB Pressure on main flow passage side
ΔPAB Pressure difference
t1 Time
t2 Time
t3 Time
t4 Time
t5 Time
t6 Time

The invention claimed is:

1. A fluid circuit, comprising:

a variable capacity hydraulic pump configured to deliver a working fluid to a main flow passage connected to an actuator;

an accumulator disposed in a branch flow passage branched from the main flow passage;

a variable throttle valve disposed in the branch flow passage branched from a main flow passage between the main flow passage and the accumulator;

a first pressure detector provided in the branch flow passage between the variable throttle valve and the accumulator;

a second pressure detector provided in the branch flow passage between the main flow passage and the variable throttle valve;

a controller that is configured to control the variable capacity hydraulic pump and a variable throttle valve in accordance with pressures detected by the first pressure detector and the second pressure detector, wherein a check valve is provided in the branch flow passage between the variable throttle valve and the first pressure detector and configured to allow the working fluid to flow from an accumulator side to a variable throttle valve side and prevent the working fluid from flowing from the variable throttle valve side to the accumulator side, the controller is configured to output a signal to reduce a flow rate of the variable capacity hydraulic pump from a first target flow rate (Q1) to a second target flow rate (Q2) smaller than the first target flow rate (Q1), based on a pressure difference (ΔPAB) between a pressure (PA) detected by the first pressure detector and a pressure (PB) detected by the second pressure detector when the pressure (PA) detected by the first pressure detector is larger than a value obtained by adding a predetermined pressure (α) to the pressure (PB) detected by the second pressure detector, and the controller is configured to output a signal to return the flow rate of the variable capacity hydraulic pump to first the target flow rate (Q1) and outputs a signal to close the variable throttle valve when a value obtained by adding the predetermined pressure (α) to the pressure difference (ΔPAB) is smaller than a predetermined threshold value (β).

2. The fluid circuit according to claim 1, wherein the check valve includes a valve body and a spring configured to urge the valve body in a valve closing direction.

* * * * *